(12) United States Patent
Albert

(10) Patent No.: US 7,280,094 B2
(45) Date of Patent: *Oct. 9, 2007

(54) BISTABLE ELECTRO-OPTIC DISPLAY, AND METHOD FOR ADDRESSING SAME

(75) Inventor: Jonathan D. Albert, Philadelphia, PA (US)

(73) Assignee: E Ink Corporation, Cambridge, MA (US)

( * ) Notice: Subject to any disclaimer, the term of this patent is extended or adjusted under 35 U.S.C. 154(b) by 269 days.

This patent is subject to a terminal disclaimer.

(21) Appl. No.: 10/711,266

(22) Filed: Sep. 7, 2004

(65) Prior Publication Data

US 2005/0017944 A1    Jan. 27, 2005

Related U.S. Application Data

(63) Continuation of application No. 09/931,418, filed on Aug. 16, 2001, now Pat. No. 6,816,147.

(60) Provisional application No. 60/226,064, filed on Aug. 17, 2000.

(51) Int. Cl.
    *G09G 3/34* (2006.01)
(52) U.S. Cl. .................................. 345/107; 345/173
(58) Field of Classification Search ............. 178/18.01, 178/19.01, 19.03, 19.04, 19.05; 345/85, 345/87, 107, 173, 174, 182, 156, 176
See application file for complete search history.

(56) References Cited

U.S. PATENT DOCUMENTS

| | | |
|---|---|---|
| 3,384,488 A | 5/1968 | Tulagin et al. |
| 3,668,106 A | 6/1972 | Ota |
| 3,756,693 A | 9/1973 | Ota |
| 3,767,392 A | 10/1973 | Ota |
| 3,792,308 A | 2/1974 | Ota |
| 3,870,517 A | 3/1975 | Ota et al. |
| 3,892,568 A | 7/1975 | Ota |
| 3,990,783 A | 11/1976 | Kohashi |
| 4,062,009 A | 12/1977 | Raverdy et al. |
| 4,071,430 A | 1/1978 | Liebert |
| 4,104,520 A | 8/1978 | Lewis et al. |
| 4,126,854 A | 11/1978 | Sheridon |
| 4,143,103 A | 3/1979 | Sheridon |
| 4,330,788 A | 5/1982 | Hinz et al. |
| 4,418,346 A | 11/1983 | Batchelder |
| 4,522,472 A | 6/1985 | Liebert et al. |

(Continued)

FOREIGN PATENT DOCUMENTS

EP     1 000 741 A2    5/2000

(Continued)

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

(Continued)

*Primary Examiner*—Nitin I. Patel
(74) *Attorney, Agent, or Firm*—David J. Cole

(57) ABSTRACT

An electro-optic display comprises a bistable electro-optic material having a viewing surface and an opposed writing surface; a deformable member disposed adjacent but spaced from the writing surface of the electro-optic material, and bearing elongate electrodes facing the writing surface of the electro-optic material; and a movable member disposed on the opposed side of the deformable member from the electro-optic material and movable parallel to the elongate electrodes, the movable member contacting and deforming the deformable member such that a portion of each elongate electrode contacts or lies closely adjacent the writing surface of the electro-optic material.

23 Claims, 2 Drawing Sheets

U.S. PATENT DOCUMENTS

| | | |
|---|---|---|
| 4,643,528 A | 2/1987 | Bell, Jr. |
| 4,648,956 A | 3/1987 | Marshall et al. |
| 4,742,345 A | 5/1988 | DiSanto et al. |
| 4,746,917 A | 5/1988 | DiSanto et al. |
| 4,833,464 A | 5/1989 | DiSanto et al. |
| 4,864,084 A | 9/1989 | Cardinale |
| 4,947,157 A | 8/1990 | DiSanto et al. |
| 4,948,232 A | 8/1990 | Lange |
| 5,041,824 A | 8/1991 | DiSanto et al. |
| 5,057,363 A | 10/1991 | Nakanishi |
| 5,066,946 A | 11/1991 | DiSanto et al. |
| 5,077,157 A | 12/1991 | DiSanto et al. |
| 5,105,185 A | 4/1992 | Nakanowatari et al. |
| 5,174,882 A | 12/1992 | DiSanto et al. |
| 5,187,609 A | 2/1993 | DiSanto et al. |
| 5,216,416 A | 6/1993 | DiSanto et al. |
| 5,223,115 A | 6/1993 | DiSanto et al. |
| 5,223,823 A | 6/1993 | DiSanto et al. |
| 5,233,459 A | 8/1993 | Bozler et al. |
| 5,247,290 A | 9/1993 | DiSanto et al. |
| 5,250,938 A | 10/1993 | DiSanto et al. |
| 5,276,438 A | 1/1994 | DiSanto et al. |
| 5,293,528 A | 3/1994 | DiSanto et al. |
| 5,302,235 A | 4/1994 | DiSanto et al. |
| 5,315,312 A | 5/1994 | DiSanto et al. |
| 5,345,251 A | 9/1994 | DiSanto et al. |
| 5,389,945 A | 2/1995 | Sheridon |
| 5,402,145 A | 3/1995 | Disanto et al. |
| 5,411,398 A | 5/1995 | Nakanishi et al. |
| 5,412,398 A | 5/1995 | DiSanto et al. |
| 5,467,107 A | 11/1995 | DiSanto et al. |
| 5,508,720 A | 4/1996 | DiSanto et al. |
| 5,527,589 A | 6/1996 | Iijima et al. |
| 5,604,027 A | 2/1997 | Sheridon |
| 5,627,561 A | 5/1997 | Laspina et al. |
| 5,650,872 A | 7/1997 | Saxe et al. |
| 5,668,576 A | 9/1997 | Ikura et al. |
| 5,708,525 A | 1/1998 | Sheridon |
| 5,717,514 A | 2/1998 | Sheridon |
| 5,717,515 A | 2/1998 | Sheridon |
| 5,723,204 A | 3/1998 | Stefik |
| 5,737,115 A | 4/1998 | Mackinlay et al. |
| 5,739,801 A | 4/1998 | Sheridon |
| 5,745,094 A | 4/1998 | Gordon, II et al. |
| 5,751,257 A | 5/1998 | Sutherland |
| 5,751,268 A | 5/1998 | Sheridon |
| 5,754,332 A | 5/1998 | Crowley |
| 5,760,761 A | 6/1998 | Sheridon |
| 5,767,826 A | 6/1998 | Sheridon et al. |
| 5,777,782 A | 7/1998 | Sheridon |
| 5,808,783 A | 9/1998 | Crowley |
| 5,815,306 A | 9/1998 | Sheridon et al. |
| 5,825,529 A | 10/1998 | Crowley |
| 5,828,432 A | 10/1998 | Shashidhar et al. |
| 5,866,284 A | 2/1999 | Vincent |
| 5,872,552 A | 2/1999 | Gordon, II et al. |
| 5,891,479 A | 4/1999 | Sheridon |
| 5,892,497 A | 4/1999 | Robertson |
| 5,894,367 A | 4/1999 | Sheridon |
| 5,900,858 A | 5/1999 | Richley |
| 5,904,790 A | 5/1999 | Sheridon |
| 5,914,805 A | 6/1999 | Crowley |
| 5,917,646 A | 6/1999 | Sheridon |
| 5,919,409 A | 7/1999 | Sheridon |
| 5,922,268 A | 7/1999 | Sheridon |
| 5,930,026 A | 7/1999 | Jacobson et al. |
| 5,961,804 A | 10/1999 | Jacobson et al. |
| 5,976,428 A | 11/1999 | Richley |
| 5,982,346 A | 11/1999 | Sheridon et al. |
| 5,989,629 A | 11/1999 | Sacripante et al. |
| 6,017,584 A | 1/2000 | Albert et al. |
| 6,027,958 A | 2/2000 | Vu et al. |
| 6,054,071 A | 4/2000 | Mikkelsen, Jr. |
| 6,055,091 A | 4/2000 | Sheridon et al. |
| 6,057,814 A | 5/2000 | Kalt |
| 6,064,410 A | 5/2000 | Wen et al. |
| 6,067,185 A | 5/2000 | Albert et al. |
| 6,081,285 A | 6/2000 | Wen et al. |
| 6,097,531 A | 8/2000 | Sheridon |
| 6,105,290 A | 8/2000 | Coates et al. |
| 6,110,538 A | 8/2000 | Sheridon |
| 6,118,426 A | 9/2000 | Albert et al. |
| 6,120,588 A | 9/2000 | Jacobson |
| 6,120,839 A | 9/2000 | Comiskey et al. |
| 6,122,094 A | 9/2000 | Silverman |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,146,716 A | 11/2000 | Narang |
| 6,147,791 A | 11/2000 | Sheridon |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,243,058 B1 | 6/2001 | Mikkelsen et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,278,131 B1 | 8/2001 | Yamazaki et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,330,054 B1 | 12/2001 | Ikami |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,518,949 B2 | 2/2003 | Drzaic |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,639,578 B1 | 10/2003 | Comiskey et al. |
| 6,664,944 B1 | 12/2003 | Albert et al. |
| 6,672,921 B1 | 1/2004 | Liang et al. |
| 6,680,725 B1 | 1/2004 | Jacobson |
| 6,683,333 B2 | 1/2004 | Kazlas et al. |
| 6,693,620 B1 | 2/2004 | Herb et al. |
| 6,710,540 B1 | 3/2004 | Albert et al. |
| 6,724,519 B1 | 4/2004 | Comiskey et al. |
| 6,727,881 B1 | 4/2004 | Albert et al. |
| 6,816,147 B2 * | 11/2004 | Albert ........................ 345/107 |

| | | | |
|---|---|---|---|
| 6,825,068 B2 | 11/2004 | Denis et al. | |
| 6,825,829 B1 | 11/2004 | Albert et al. | |
| 6,839,158 B2 | 1/2005 | Albert et al. | |
| 6,842,657 B1 | 1/2005 | Drzaic et al. | |
| 6,864,875 B2 | 3/2005 | Drzaic et al. | |
| 6,866,760 B2 | 3/2005 | Paolini Jr. et al. | |
| 2001/0046081 A1 | 11/2001 | Hayashi et al. | |
| 2002/0060321 A1 | 5/2002 | Kazlas et al. | |
| 2002/0063661 A1 | 5/2002 | Comiskey et al. | |
| 2002/0090980 A1 | 7/2002 | Wilcox et al. | |
| 2002/0113770 A1 | 8/2002 | Jacobson et al. | |
| 2002/0130832 A1 | 9/2002 | Baucom et al. | |
| 2003/0020844 A1 | 1/2003 | Albert et al. | |
| 2004/0119681 A1 | 6/2004 | Albert et al. | |
| 2005/0035941 A1 | 2/2005 | Albert et al. | |

FOREIGN PATENT DOCUMENTS

| | | |
|---|---|---|
| EP | 1 162 496 A1 | 12/2001 |
| EP | 1 145 072 B1 | 5/2003 |
| GB | 2 149 548 A | 6/1985 |
| JP | 10-048673 A | 2/1998 |
| JP | 2000-162650 | 6/2000 |
| JP | 2000-321605 | 11/2000 |
| JP | 2000-322006 | 11/2000 |
| WO | WO 00/05704 | 2/2000 |
| WO | WO 00/36560 | 6/2000 |
| WO | WO 00/38000 | 6/2000 |
| WO | WO 00/67110 | 11/2000 |
| WO | WO 00/67327 | 11/2000 |
| WO | WO 01/07961 | 2/2001 |
| WO | WO 01/27690 | 4/2001 |

OTHER PUBLICATIONS

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Drzaic, P., et al., "A Printed and Rollable Bistable Electronic Display", SID 98 Digest (1998), p. 1131.

Jacobson, J., et al., "The last book", IBM Systems J., 36, 457 (1997).

Jo, G-R, et al., "Toner Display Based on Particle Movements", Chem. Mater, 14, 664 (2002).

Kazlas, P., et al., "12.1" SVGA Microencapsulated Electrophoretic Active Matrix Display for Information Applicances, SID 01 Digest, 152 (Jun. 2001).

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal $TiO_2$ Films", Nature, vol. 353, Oct. 24, 1991, 773-740.

Yamaguchi, Y., et al., "Toner display using insulative particles charged triboelectrically", Asia Display/IDW '01, p. 1729, Paper AMD4-4 (2001).

\* cited by examiner

BISTABLE ELECTRO-OPTIC DISPLAY, AND METHOD FOR ADDRESSING SAME

REFERENCE TO RELATED APPLICATIONS

This application is a continuation of application Ser. No. 09/931,418, filed Aug. 16, 2001 now U.S. Pat. No. 6,816,147, which itself claims priority from Provisional Application Ser. No. 60/226,064, filed Aug. 17, 2000; the entire disclosure of both the aforementioned applications is herein incorporated by reference.

FIELD OF THE INVENTION

This invention relates to a a bistable electro-optic material display and to a method for addressing such a display. The term "electro-optic material" is used herein in its conventional meaning in the art to refer to a material having first and second display states differing in at least one optical property, the material being capable of being changed from its first to its second display state by application of an electric field to the material. The terms "bistable" and "bistability" are used herein in their conventional meanings in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times the minimum duration of the addressing pulse required to change the state of the display element. These terms are also to be construed to include materials having more than two display states which are stable in this manner.

BACKGROUND OF THE INVENTION

Electrophoretic and other electro-optic displays have been the subject of intense research and development for a number of years. Such displays can have attributes of good brightness and contrast, wide viewing angles, state bistability, and low power consumption when compared with liquid crystal displays. Nevertheless, problems with the long-term image quality of electrophoretic displays have prevented their widespread usage. For example, particles that make up electrophoretic displays tend to cluster and settle, resulting in inadequate service-life for these displays.

An encapsulated, electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

One problem in addressing electrophoretic and similar electro-optic display materials is that typically such materials do not exhibit any significant threshold, i.e., even a small electric field will cause the material to change its display state if the small field is sustained for a considerable period of time. Consequently, it is usually not possible to address such materials using a passive matrix addressing scheme such as is often used with liquid crystal displays. Accordingly, such display materials are addressed using (a) a "direct-drive" addressing scheme, in which each pixel is provided with a separate electrode which can be addressed via its own drive line; (b) an active matrix addressing scheme in which each pixel is provided with an associated non-linear element (such as a transistor); or (c) a moving head addressing scheme, in which a head containing a number of individually controllable discrete electrodes is moved across the display, so that each electrode writes one line of the display.

All three of these addressing schemes have disadvantages. A direct-drive addressing scheme is practicable for a textual display (see, for example, International Application PCT/US99/16652, Publication No. WO 00/05704, which describes such a display using 63 electrodes for each text character) but impracticable for a graphic display, since providing the large number of drive lines required for a graphic display would necessitate excessively complex and expensive circuitry. Active matrix addressing schemes require complex and relatively expensive circuitry, the cost of which typically far exceeds the cost of the electro-optic medium itself. Furthermore, since the cost of producing active matrix addressing circuitry is typically directly proportional to the area of the display, this type of addressing scheme is impracticable for very large displays, for example signs intended as electronic billboards in sports stadia or as message boards in large exhibition halls. Moving head addressing schemes tend to be inexpensive but, since the head needs to be in intimate contact with the electro-optic medium to produce the large electric fields needed to change the display state of most electro-optic materials, the friction between the moving head and the electro-optic material causes wear on the material and limits the life of the display. Furthermore, a moving head is highly sensitive to any slight unevenness in the display material, and in very large signs it is difficult to avoid such unevenness in the display material, especially if the large sign is to be used outdoors, where wind gusts might slightly distort the medium.

The present invention seeks to provide an electro-optic display, and a method for addressing such a display, which are comparable in cost and complexity to a moving head addressing scheme, but which reduce or eliminate frictional wear on the electro-optic material and which are less susceptible to unevenness of the electro-optic material.

SUMMARY OF THE INVENTION

Accordingly, this invention provides an electro-optic display comprising:

a bistable electro-optic material having on one side thereof a viewing surface on which the display can be viewed, and on the opposed side thereof a writing surface;

a deformable member disposed adjacent but spaced from the writing surface of the electro-optic material, the deformable member bearing a plurality of elongate electrodes formed on its surface facing the writing surface of the electro-optic material; and a movable member disposed on the opposed side of the deformable member from the electro-optic material and movable relative to the deformable member in a direction substantially parallel to the length of the elongate electrodes, the movable member contacting and deforming the deformable member such that a portion of each elongate electrode contacts or lies closely adjacent the writing surface of the electro-optic material.

This invention also provides a method for addressing an electro-optic display of the invention as defined above. In this addressing method, the movable member is placed in a first position relative to the deformable member and a first set of potentials are placed on the elongate electrodes, thereby writing a first column of pixels of the display, each of this column of pixels being defined by the portion of one elongate electrode which contacts or lies closely adjacent the writing surface of the electro-optic material when the movable member is in its first position. The movable member is then moved to a second position relative to the deformable member, this second position being spaced from the first position, and a second set of potentials are placed on the elongate electrodes, at least one of the second set of potentials differing from the first set of potentials, thereby writing a second column of pixels of the display, each of this column of pixels being defined by the portion of one elongate electrode which contacts or lies closely adjacent the writing surface of the electro-optic material when the movable member is in its second position.

BRIEF DESCRIPTION OF THE DRAWINGS

Preferred embodiments of the invention, will now be described in more detail, though by way of illustration only, with reference to the accompanying drawings, in which.

DETAILED DESCRIPTION OF THE INVENTION

Figure 1:
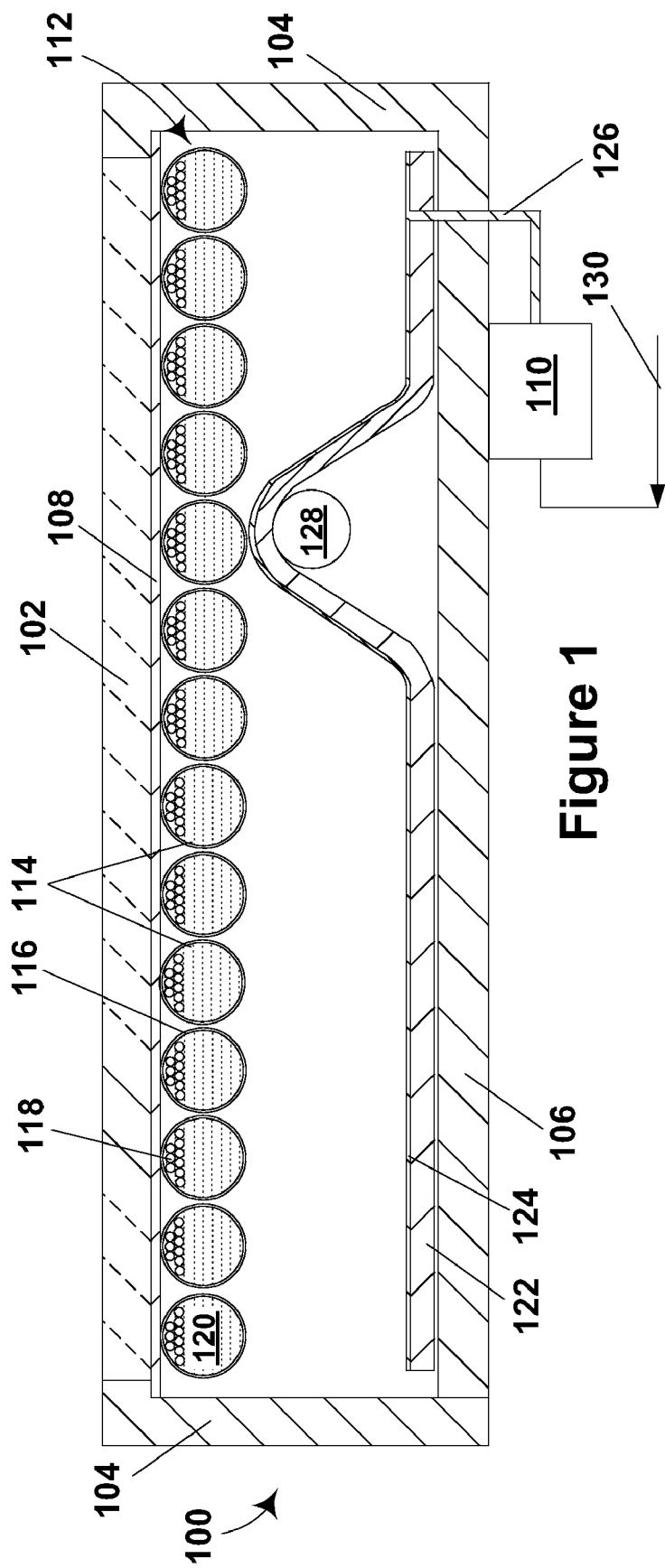
FIG. 1 is a cross section through a preferred display of the present invention, this section being taken in a vertical plane perpendicular to the viewing surface of the display.

In the display of the present invention, wear on the electro-optic material is substantially reduced, as compared with a similar moving head display, because the deformable member does not slide across the electro-optic material; instead, as the movable member moves relative to the deformable member, each section of the latter is in turn moved directly toward and then away from the electro-optic material. In effect, the movable member creates a "transverse wave" which travels along the deformable member and, as any physicist knows, in such a wave particles moved by the wave (in this case, the sections of the deformable member) do not move in the direction of travel of the wave but only perpendicular thereto. Also, because the deformable member can be made with considerable elasticity (the deformable member may have the form of a thin sheet of a flexible material, for example a "blanket" made from a rubber or a flexible polymer), the deformable member can conform to any slight unevenness of the electro-optic material, thus rendering the display less sensitive to such unevenness. The movable member can also be made compliant to assist in the deformable member conforming to any unevenness in the surface of the electro-optic material. To this end, the portion of the movable member which contacts the deformable member may itself be deformable; for example, a rotatable movable member (as to which, see further below) may comprise a substantially rigid core and a deformable sleeve (formed for instance from a semi-rigid foam polymer) surrounding the core and contacting the deformable member.

The electro-optic material used in the present display may be any such material which is bistable for a period at least equal to the time needed to write the entire display. Thus, the electro-optic material may be an electrophoretic material comprising electrically charged particles suspended in a fluid and capable of moving therethrough when an electric field is applied to the material. For reasons already mentioned, it is preferred that such an electrophoretic material be of the encapsulated type in which the charged particles and the fluid are contained with a plurality of capsules (sometimes called "microcapsules"). The capsules may be dispersed in a binder and may be of any size or shape. The capsules may be spherical or non-spherical and their diameters may range from a few microns to a few millimeters, but are preferably in the range of from about 10 to a few hundred microns. The capsules may contain two or more different types of charged particles, and these particles may be colored, luminescent, the light-absorbing or transparent, and may include neat pigments, dyed (laked) pigments or pigment/polymer composites.

Typically, an encapsulated electrophoretic display includes one or more species of particles that either absorb or scatter light. For example, such a display may comprise a plurality of capsules each of which contains one or more species of charged particles in a dyed suspending fluid. Alternatively, the display might comprise a plurality of capsules each of which contains, in a substantially uncolored suspending fluid, at least two species of charged particles differing in at least one optical characteristic and having differing electrophoretic mobilities; typically, one species of particle absorbs light (and is thus black or dark), while the other species of particle scatters light (and is thus white or light). Other variations are possible; the display may contain more than two species of particles, the suspending fluid may be clear or dyed, etc.

Although reference has been made in the foregoing description to capsules and a binder in a manner which suggests that an encapsulated electrophoretic medium necessarily comprises a plurality of discrete capsules, the electro-optic material used in the present display may also have the form of a "polymer-dispersed electrophoretic display", hereafter abbreviated "PDED". Essentially, a PDED is a two-phase system in which the electrophoretic material comprises a continuous phase and a discontinuous phase. The discontinuous phase comprises a plurality of droplets of an electrophoretic fluid (as usual, comprising a liquid and at least one particle disposed within the liquid and capable of moving therethrough on application of an electric field to the liquid), and the continuous phase (which is typically a polymeric material, although other materials may be useful) surrounds and encapsulates the discontinuous phases. The discrete droplets of electrophoretic fluid within a PDED may be referred to as capsules or microcapsules even though no discrete capsule membrane is associated with each individual droplet. Accordingly, references to "capsules" herein are to be construed as extending to PDED's, which are considered to be subsets of encapsulated electrophoretic displays.

Electrophoretic displays of the present invention can make use of any known materials and processes for the production of such displays, as described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,721; and 6,252,564, and International Applications Publication Nos. WO 97/04398; WO 98/03896; WO 98/19208; WO 98/41898; WO 98/41899; WO 99/10769; WO 99/10768; WO 99/10767; WO 99/53373; WO 99/56171; WO 99/59101; WO 99/47970; WO 00/03349; WO 00/03291; WO 99/67678; WO 00/05704; WO 99/53371; WO 00/20921; WO 00/20922; WO 00/20923; WO 00/26761; WO 00/36465; WO 00/38000; WO 00/38001; WO 00/36560; WO 00/20922; WO 00/36666; WO 00/59625; WO 00/67110; WO 00/67327; WO 01/02899; WO 01/07961; WO 01/08241; WO 01/08242; WO 01/17029; WO 01/17040; and WO 01/17041; the entire disclosures of all these patents and applications are herein incorporated by reference.

The electro-optic material used in the present display can also be of the rotating bichromal member type, as described, for example in U.S. Pat. No. 5,808,783 (Crowley), U.S. Pat. No. 5,777,782 (Sheridon) and U.S. Pat. No. 5,760,761 (Sheridon). Although this type of medium is typically referred to as a "rotating bichromal ball" medium, the term "rotating bichromal member" is believed more accurate, since the rotating members are not always spheres; for example, U.S. Pat. Nos. 5,894,367; 5,922,268; 6,055,091; and 6,097,531 describe electro-optic materials of this type in which the rotating members are cylindrical, while U.S. Pat. No. 6,147,791 describes electro-optic materials in which the rotating members are polygonal prisms. It should also be understood that the term "bichromal" is used in a broad sense to mean "having at least two segments differing in an optical characteristic"; for example, U.S. Pat. Nos. 5,751,268; 5,891,479; 5,892,497; and 5,919,409 describe electro-optic materials of this type using rotating balls having more than two contrasting segments, and some of these segments may be transparent.

Other types of bistable electro-optic materials may also be used on the apparatus and method of the present invention.

The deformable member used in the present display may be formed from any flexible material having sufficient toughness to withstand repeated passages of the movable member thereacross. Typically, the deformable member well comprise a thin sheet or film of a natural or synthetic rubber or a polymer. The elongate electrodes on the deformable member are conveniently formed by printing (as previously defined) a conductive ink on to the deformable member; since electrophoretic displays draw very little current, such displays can be used with electrodes having relatively high resistances.

For obvious reasons, it is important that the portion of the deformable member which contacts the electro-optic material lie flat against the electro-optic material without creasing or distortion, and to avoid such creasing or distortion the deformable member should be disposed spaced from, but parallel to, the electro-optic material. The manner in which the deformable member is maintained parallel to the electro-optic material may vary depending upon the orientation of these two members. For example, if the electro-optic material is in the form of a flat, horizontally-disposed sheet, a horizontal support surface could be provided parallel to the electro-optic material, and the deformable member allowed to rest upon this support surface, with the movable member passing over the support surface. If, however, the electro-optic material is disposed in a substantially vertical plane, it may be convenient to keep the deformable member parallel to the electro-optic material by providing tensioning means for holding the deformable member under tension such that portions of the deformable member not in contact with the movable member will be held spaced from the electro-optic material. For example, one pair of opposed edges of the electro-optic material could be provided with projecting ridges or flanges extending toward the deformable member, with the deformable member being stretched under tension across these ridges or flanges, and the movable member passing between the ridges or flanges to contact central portions of the deformable member with the electro-optic material. Other methods of maintaining the deformable member parallel to the electro-optic material will be apparent to skilled engineers; for example, the spacing between these two members might be maintained by providing a layer of liquid or of pressurized gas disposed between the electro-optic material and the deformable member such that portions of the deformable member not in contact with the movable member will be held spaced from the electro-optic material.

The movable member used in the display of the present invention may simply slide across the deformable member. However, since the friction between such a sliding member and the deformable member may lead to undesirable distortion of, and wear on, the deformable member, it is desirable that such friction be reduced as far as possible, for example by providing a smoothly rounded surface on the part of the movable member which contacts the deformable member and/or by providing a friction-reducing layer (formed, for example, from a solid lubricant) on one or both members. It is generally preferred that the movable member be rotatable so that the movable member can roll across the deformable member, desirably with minimal friction. Since the size of the pixels of the display is controlled by the area of contact of each individual electrode on the deformable member with the electro-optic material, and to this area is in turn controlled by the area of contact between the movable member and the deformable member, it is desirable that the diameter of the movable member be reduced as far as possible, provided that this diameter is not reduced so far that the movement of the movable member will cause excessive wear on or damage to the deformable member. Because of this limitation on pixel size imposed by the area of contact between each electrode and the electro-optic material, the present display will typically not be used for high resolution displays. However, the present display is well-suited for use in inexpensive, low resolution displays, for example in toys or low cost message pads or boards intended for domestic use, and is also well-suited for use in very large displays, for example billboard-type signs in sports arenas, or message boards in convention or exhibition halls, where large pixels are not objectionable but where the large area of the sign would render either direct drive or active matrix addressing schemes impracticably costly.

Most electro-optic materials require large electric fields for proper operation, and are thus highly sensitive to any variation in the spacing between the electrodes which apply the electric field to the electro-optic material. Accordingly, in the present display, it is important that the deformable member lie flat against the electro-optic material to ensure that a consistent electric field is applied to this material. Thus, it is desirable that the movable member be provided with biasing means for urging the movable member into engagement with the deformable member, and hence urging the deformable member to contact the electro-optic material. Also, especially when the display is intended for outdoor use, it is desirable to provide sealing means for preventing entry of small particles between the electro-optic material and the deformable member, since even very small particles may be sufficient to affect the proper operation of the display. Such a sealing means could comprise a sealing member sealingly engaged with peripheral portions of both the electro-optic material and the deformable member so as to form a closed chamber between the writing surface of the electro-optic material and the electrode-carrying surface of the deformable member. Alternatively, the sealing means may comprise a sealed housing enclosing the electro-optic material, the deformable member and the movable member. Such a sealed housing will of course also prevent entry of dust and other small particles between the deformable member and the movable member; this may be desirable, but is of less concern than entry of particles between the electro-optic material and the deformable member since the flexibility of the deformable member, and optionally that of the movable member will usually accommodate small particles therebetween without adverse effects on the performance of the display.

When a display of the present invention is rewritten to change one image into another, the new image will appear progressively as the movable member traverses along the electro-optic material, thus producing a visually-interesting "wipe". To save time when a series of images are to be displayed, conveniently the movable member is moved in one direction to change a first image to a second, and in the opposed direction to change the second image to a third. It is well within the level of skilled in the electronics art to arrange for the reversal of the order of data signals to the elongate electrodes required to cope with such bidirectional rewriting of a display. Also, although it might at first appear that the movable member should be moved in a step wise manner to ensure proper writing of each pixel of the display, in practice the movable member can be moved continuously without any serious loss of image quality.

Figure 2:
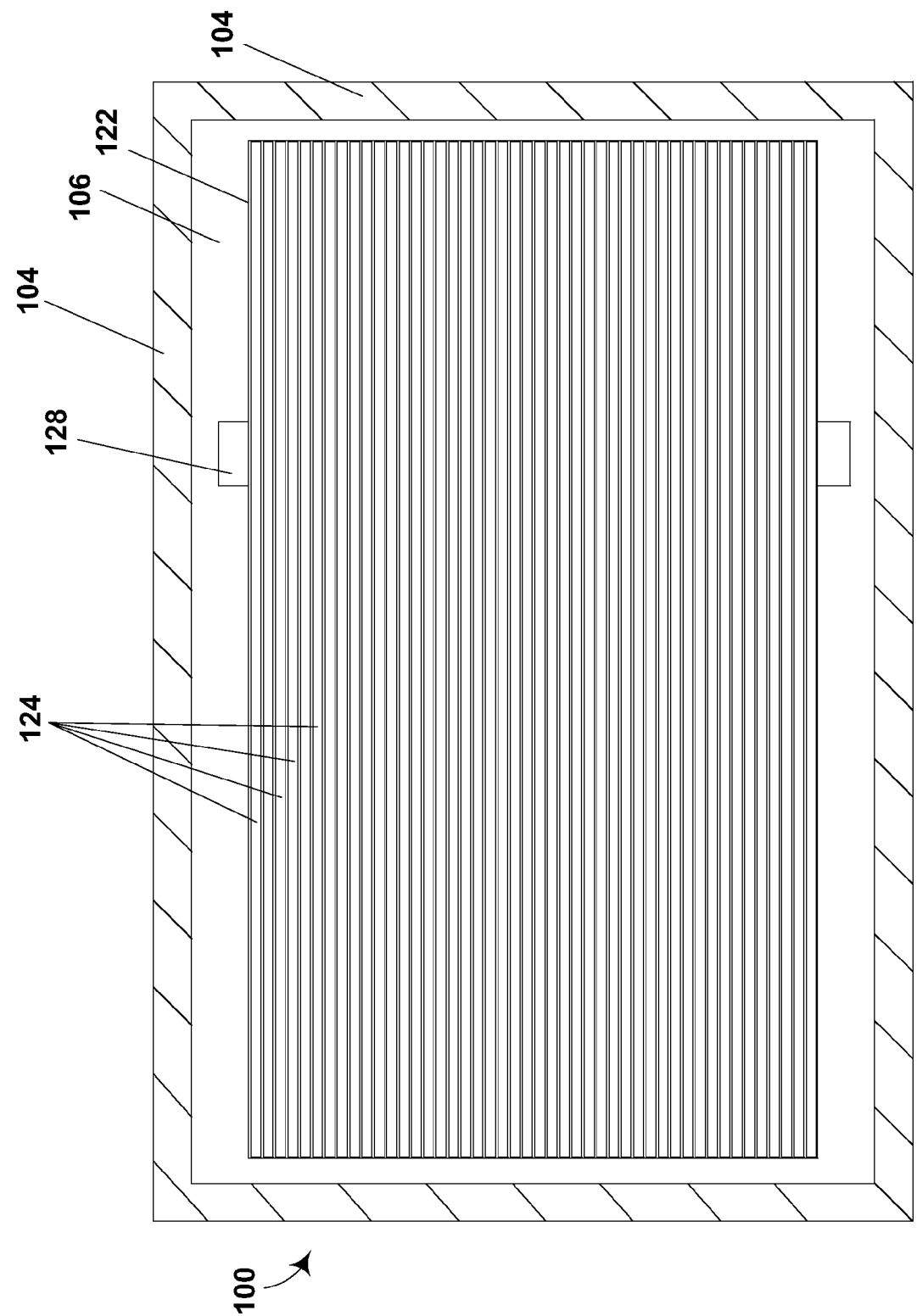
FIG. 2 is a top plan view of the display shown in FIG. 1 with the electro-optic material, front electrode and window removed to show details of the deformable member.

The display (generally designated 100) shown in FIGS. 1 and 2 of the accompanying drawings comprises a cuboidal housing, which itself comprises a transparent window 102 (through which an observer views the display), sidewalls 104 and a rear wall 106. On the inner surface of the window 102 is provided a transparent electrode 108, which may be formed from, for example, indium-tin oxide, and which extends across the whole area of the display 100. This electrode 108 is maintained at ground potential by means of a connection (not shown) to a control unit 110 mounted on the rear wall 106 of the housing.

On the inner surface of the electrode 108 is coated a layer (generally designated 112) of electro-optic material. Thus, the surface (the upper surface as illustrated in FIG. 1) of the electro-optic material 112 adjacent the electrode 108 is visible to an observer viewing the display through the transparent window 102 and the transparent electrode 108 and thus forms a "viewable surface" of the electro-optic material 112. This electro-optic material is an encapsulated electrophoretic medium of the type described in, for example, U.S. Pat. No. 6,067,185, and comprises a plurality of microcapsules 114, each of which comprises a capsule wall 116, which encloses an internal phase comprising a single type of charged particle 118 (assumed for present purposes to be negatively-charged, though obviously a positively-charged particle could equally well be used) dispersed in a colored liquid 120. In one form of this electrophoretic display, the charged particles 118 comprise titania particles, negatively charged and having a diameter of about 250 nm, while the liquid 120 comprises a hydrocarbon having dissolved therein a blue dye. For ease of illustration and comprehension, the size of the microcapsules 114 is greatly exaggerated in FIG. 1. Also, although for ease of illustration, the microcapsules 114 are shown as spherical in FIG. 1, in fact, for reasons explained in the aforementioned U.S. Pat. No. 6,067,185, it is preferred that the microcapsules have a flattened, non-spherical form.

The display 100 further comprises a deformable member 122, which comprises a thin sheet of flexible material and which carries on its upper surface (the surface facing the electro-optic layer 112) a plurality of parallel elongate electrodes 124 (best seen in FIG. 2). Each of the electrodes 124 is connected via an associated conductor 126 (only one of these conductors is shown in FIG. 1), which extends through the deformable member 122 and the rear wall 106, to the control unit 110.

The major portion of the deformable member 122 rests upon the upper surface of the rear wall 106; thus, this upper surface serves as a support surface for the deformable member 122. However, a cylindrical and rotatable movable member 128 is positioned between the deformable member 122 and the upper surface of the rear wall 106; the movable member 128 is disposed so that the small portions of the electrodes 124 on the deformable member 122 lying directly on top of the movable member 128 contact the electro-optic layer 112. Thus, these small portions of the electrodes define one column of pixels of the display 100.

The movable member 128 is provided with drive means (not shown) which translate it in either direction parallel to the length of the electrodes 124, i.e., left-right in FIG. 1. Conveniently, the movable member can be provided at each end with a threaded aperture engaged with a threaded drive rod, which is rotated by an electric motor under the control of the control unit 110. As will be apparent from FIG. 1, the movement of the movable member 128 causes different portions of the electrodes 124 on the deformable member 122 to contact the lower surface (as illustrated in FIG. 1) of the electro-optic layer 112, thus enabling different portions of this layer to be rewritten. Thus, the lower surface of the electro-optic layer 112 serves as a writing surface.

The control unit 110 is arranged to receive digital graphic image files in any convenient file format via an input line 130 and to generate signals of +V, 0 or −V on each of the electrodes 124. Since the particles 118 within the microcapsules 114 are negatively charged, if a signal of −V is applied to an electrode 124, the particles 118 in the microcapsules 114 adjacent the portion of that electrode 124 in contact with the electro-optic layer 112 will be repelled from the electrode 124 and will gather adjacent the electrode 108. Thus, an observer viewing the display through the window 102 will see the color of the particles 118, and the pixel will appear white. If, on the other hand, a signal of +V is applied to the electrode 124, the particles 118 in the microcapsules 114 adjacent the portion of that electrode 124 in contact with the electro-optic layer 112 will be attracted to, and gather adjacent, that electrode 124. Thus, an observer viewing the display through the window 102 will see the color of the colored liquid 120, typically blue. If a signal of 0 is applied to an electrode 124, the particles 118 adjacent the portion of that electrode 124 in contact with the electro-optic layer 112 will experience no electric field, and thus the pixel will remain in the same state as it was previously.

Numerous changes and modifications can be made in the preferred embodiments of the present invention already described without departing from the spirit and skill of the invention. For example, the single particle/dyed suspending fluid electrophoretic medium shown in the drawings could be replaced by the two particle/undyed suspending fluid electrophoretic medium already described. Accordingly, the foregoing description is to be construed in an illustrative and not in a limitative sense.

From the foregoing description, it will be seen that the present invention provides an electro-optic display in which wear on the electro-optic material is substantially reduced, as compared with a similar conventional moving head display. The display of the present invention can also be made less susceptible to slight unevenness in the electro-optic material than conventional moving head displays.

What is claimed is:

1. An electro-optic display comprising:
   a bistable electro-optic material having on one side thereof a viewable surface visible to an observer viewing the display, and on the opposed side thereof a writing surface;
   a deformable member contacting the writing surface of the electro-optic material, the deformable member having a plurality of electrodes formed on its surface contacting the writing surface of the electro-optic material; and
   a movable member disposed on the opposed side of the deformable member from the electro-optic material and movable relative to the electro-optic material, the movable member urging the deformable member into contact with the electro-optic material such that movement of the movable member relative to the electro-optic material will cause the area of contact between the deformable member and the electro-optic material to move across the writing surface of the electro-optic material.

2. An electro-optic display according to claim 1 wherein the electro-optic material is an encapsulated electrophoretic material.

3. An electro-optic display according to claim 2 wherein the encapsulated electrophoretic material comprises a plurality of capsules each of which contains one or more species of charged particles in a suspending fluid, the charged particles being capable of moving through the fluid upon application of an electric field to the material.

4. An electro-optic display according to claim 2 wherein the encapsulated electrophoretic material comprises a plurality of capsules each of which contains, in a substantially uncolored suspending fluid, at least two species of charged particles differing in at least one optical characteristic and having differing electrophoretic mobilities, the charged particles being capable of moving through the fluid upon application of an electric field to the material.

5. An electro-optic display according to claim 2 wherein the encapsulated electrophoretic material comprises a two-phase electrophoretic medium comprising a continuous phase and a discontinuous phase, the discontinuous phase comprising a plurality of droplets, each of which comprises a suspending fluid and at least one particle disposed within the suspending fluid and capable of moving through the fluid upon application of an electric field to the material, and the continuous phase surrounding and encapsulating the discontinuous phase.

6. An electro-optic display according to claim 1 wherein the electro-optic material is a rotating bichromal member material.

7. An electro-optic display according to claim 1 wherein the deformable member has the form of a thin sheet of a flexible material.

8. An electro-optic display according to claim 7 wherein the deformable member is provided with tensioning means for holding the deformable member under tension such that portions of the deformable member not in contact with the movable member will be held spaced from the electro-optic material.

9. An electro-optic display according to claim 7 further comprising a layer of liquid or pressurized gas disposed between the electro-optic material and the deformable member such that portions of the deformable member not in contact with the movable member will be held spaced from the electro-optic material.

10. An electro-optic display according to claim 1 wherein the electrodes are formed by printing a conductive ink on to the deformable member.

11. An electro-optic display according to claim 1 wherein at least one of the deformable member and the movable member is provided with a friction-reducing layer.

12. An electro-optic display according to claim 1 wherein the movable member is rotatable such that the movable member can roll across the surface of the deformable member.

13. An electro-optic display according to claim 1 wherein at least the portion of the movable member which contacts the deformable member is itself deformable.

14. An electro-optic display according to claim 13 wherein the movable member is rotatable and comprises a substantially rigid core and a deformable sleeve surrounding the core and contacting the deformable member.

15. An electro-optic display according to claim 1 further comprising sealing means for preventing entry of small particles between the electro-optic material and the deformable member.

16. An electro-optic display according to claim 15 wherein the sealing means comprises a sealing member sealingly engaged with peripheral portions of both the electro-optic material and the deformable member so as to form a closed chamber between the writing surface of the electro-optic material and the electrode-carrying surface of the deformable member.

17. An electro-optic display according to claim 15 wherein the sealing means comprises a sealed housing enclosing the electro-optic material, the deformable member and the movable member.

18. A method for addressing an electro-optic display, this electro-optic display comprising: a bistable electro-optic material having on one side thereof a viewable surface visible to an observer viewing the display, and on the opposed side thereof a writing surface; a deformable member contacting the writing surface of the electro-optic material, the deformable member having a plurality of electrodes formed on its surface contacting the writing surface of the electro-optic material; and a movable member disposed on the opposed side of the deformable member from the electro-optic material and movable relative to the electro-optic material, the movable member urging the deformable member into contact with the electro-optic material such that movement of the movable member relative to the electro-optic material will cause the area of contact between the deformable member and the electro-optic material to move across the writing surface of the electro-optic material, the method comprising:
   placing the movable member in a first position relative to the electro-optic material and placing a first set of potentials on the electrodes, thereby writing a first column of pixels of the display, each of this column of pixels being defined by the portion of one electrode which contacts the writing surface of the electro-optic material when the movable member is in its first position; and moving the movable member to a second position relative to the electro-optic material, this second position being spaced from the first position, and placing a second set of potentials are placed on the electrodes, at least one of the second set of potentials differing from the first set of potentials, thereby writing a second column of pixels of the display, each of this column of pixels being defined by the portion of one electrode which contacts the writing surface of the electro-optic material when the movable member is in its second position.

19. A method according to claim 18 further comprising holding the deformable member under tension such that portions of the deformable member not in contact with the movable member are held spaced from the movable member.

20. A method according to claim 18 further comprising providing the electrodes by printing a conductive ink on to the deformable member.

21. A method according to claim 19 wherein the movable member is rotatable and rolls across the surface of the deformable member.

22. A method according to claim 21 wherein the movable member comprises a substantially rigid core and a deformable sleeve surrounding the core and contacting the deformable member.

23. A method according to claim 19 further comprising sealing the space between the electro-optic material and the deformable member to prevent entry of small particles therein.

* * * * *